United States Patent
Sun et al.

(10) Patent No.: US 10,263,497 B2
(45) Date of Patent: Apr. 16, 2019

(54) SYSTEM AND METHOD FOR ACTIVE COOLING OF ON-MACHINE DEVICES

(71) Applicant: Rockwell Automation Technologies, Inc., Mayfield Heights, OH (US)

(72) Inventors: Edwin Xikai Sun, Shanghai (CN); Wei Zhu, Shanghai (CN); Shun Feng, Edina, MN (US); Mark R. Cooper, Eden Prairie, MN (US); Paul J. Grosskreuz, West Bend, WI (US); Robert H. Schmidt, Germantown, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 357 days.

(21) Appl. No.: 15/009,980

(22) Filed: Jan. 29, 2016

(65) Prior Publication Data
US 2017/0222521 A1     Aug. 3, 2017

(51) Int. Cl.
H02K 9/22      (2006.01)
H02K 11/00     (2016.01)
H02K 11/21     (2016.01)

(52) U.S. Cl.
CPC ............. *H02K 9/22* (2013.01); *H02K 11/21* (2016.01)

(58) Field of Classification Search
CPC ...... H02K 11/215; H02K 11/00–11/40; H02K 9/00–9/28; F25B 21/02
USPC .... 310/52, 54, 58, 59, 64, 68 B, 68 A–68 R; 62/3.2
See application file for complete search history.

(56) References Cited

U.S. PATENT DOCUMENTS

| | | | |
|---|---|---|---|
| 3,152,271 A | 10/1964 | Yamano et al. | |
| 4,453,503 A | 6/1984 | Freeburn | |
| 6,568,193 B1 | 5/2003 | Cahill | |
| 8,392,035 B2 | 3/2013 | Patel et al. | |
| 2008/0010998 A1* | 1/2008 | Ouyang | H01L 35/30 62/3.2 |
| 2010/0302736 A1* | 12/2010 | Miyashita | H02K 9/22 361/706 |
| 2013/0076174 A1* | 3/2013 | Wibben | H02K 9/14 310/64 |
| 2014/0077630 A1 | 3/2014 | Jiang et al. | |
| 2014/0097772 A1 | 4/2014 | Versailles et al. | |

FOREIGN PATENT DOCUMENTS

JP     2014192990 A  * 10/2014

OTHER PUBLICATIONS

Machine Translation, Shiga, JP 2014192990 A, Oct. 2014.*
"Compliance, n." OED Online. Oxford University Press, Jun. 2018. Web. Aug. 27, 2018. (Year: 2018).*

* cited by examiner

*Primary Examiner* — Thomas Truong
(74) *Attorney, Agent, or Firm* — Boyle Fredrickson, SC

(57) ABSTRACT

A system and method for cooling an enclosed position feedback device mounted to a motor is disclosed. An active cooling device is mounted between the position feedback device and the housing enclosing the position feedback device. A compliant mount is provided to accommodate vibration in the position feedback device. The compliant mount may be a compliant thermal pad positioned between the feedback device and the active cooling device. Optionally, the compliant mount may be provided between the motor and the position feedback device.

20 Claims, 2 Drawing Sheets

SYSTEM AND METHOD FOR ACTIVE COOLING OF ON-MACHINE DEVICES

BACKGROUND OF THE INVENTION

The subject matter disclosed herein relates generally to providing for cooling of devices mounted to an electric motor and, more specifically, to a system for providing active cooling of a position feedback device mounted to one end of a motor.

Electric motors are commonly used in many applications. Electric motors include a housing in which the rotor and stator are mounted. A motor shaft, coupled to the rotor extends through one end of the housing and is coupled to a device to be driven by the motor. Operation of an electric motor generates heat. The amount of heat is dependent on many factors, such as the magnitude of current applied to the motor, the frequency of rotation of the motor, winding construction, and the like. The motor and housing will be designed to manage and dissipate the heat as effectively as possible. The final construction of the motor will result in certain operating characteristics for the motor. The operating characteristics may define for example, current ratings, torque ratings, temperature ratings, and the like for the motor.

As is understood in the art, it is often desirable to provide a motor drive or other devices, such as a position feedback device to control operation of a motor. The motor drive typically includes solid state switching devices that control the amplitude and frequency of voltage supplied to the motor, which, in turn, controls the speed and/or torque produced by the motor. Position feedback devices are coupled to the rotor of the motor to generate a signal corresponding to the angular position of the rotor. The motor drive may use the position signal directly to cause the motor to move to a desired angular orientation or convert the position signal into a speed signal to, cause the motor to rotate at a desired speed.

In certain environments, it is desirable to provide a housing around the position feedback device, where the housing may be connected to the end of the motor. The housing may prevent contamination from dust or liquid in the atmosphere and/or may protect the position feedback device from being physically struck during assembly, operation, and/or maintenance of the machine on which the motor and feedback device is mounted. It is known, however, that heat may build up within the housing around the position feedback device. In addition, the position feedback device may not be designed to withstand the same environmental conditions as the motor. As a result, the position feedback device and, in particular, an enclosed position feedback device may be the thermally limiting component for a motor assembly. Therefore, the motor in the motor assembly may not be able to operate up to its full temperature rating for which it was designed in, order to avoid damaging the position feedback device.

Thus, it would be desirable to provide a system for cooling an enclosed position feedback device mounted to a motor.

BRIEF DESCRIPTION OF THE INVENTION

The subject matter disclosed herein describes a system and method for cooling an enclosed position feedback device mounted to a motor. An active cooling device is mounted between the position feedback device and the housing enclosing the position feedback device. A compliant mount is provided to accommodate vibration in the position feedback device. The compliant mount may be a compliant thermal pad positioned between the feedback device and the active cooling device. Optionally, the compliant mount may be provided between the motor and the position feedback device.

According, to one embodiment of the invention, a system for cooling a position feedback device mounted to a motor is disclosed. The position feedback device is enclosed within a housing connected to the motor, and the system includes an active cooling device having a first side and a second side opposite the first side. The active cooling device receives electrical power to generate a heat gradient across the active cooling device such that a first, temperature of the first side is less than a second temperature of the second side when, the electrical power is applied to the active cooling device. The first side of the active cooling device is mounted to the position feedback device, and the second side of the active cooling device is mounted to the housing. The system also includes a compliant mounting device for the position feedback device. The compliant mounting device is operatively connected to the position feedback device and to either the motor or the active cooling device.

Thus, it is, a feature of the present invention that an active cooling device may be mounted between a position feedback device subject to vibration from the motor and a housing rigidly coupled to the motor.

According to another embodiment of the invention, a method of cooling a position feedback device mounted to a motor, where the position feedback device is enclosed within a rear cover of a housing for the motor is disclosed. The method includes mounting the position feedback device to the motor and mounting an active cooling device, having a first side and a second side opposite the first side, to the position feedback device. The active cooling device receives electrical power to generate a heat gradient across the active cooling device such that a first temperature of the first side is less than a second temperature of the second side when the electrical power is applied to the active cooling device. The first side of the active cooling device is mounted to the position feedback device, and the second side of the active cooling device is mounted to the housing. A compliant mount is provided for the position feedback device, and the compliant mount is operatively connected to the position feedback device and to either the motor or the active cooling device.

According to still another embodiment of the invention, a system for cooling a position feedback device mounted to a motor is disclosed, where the position feedback device is enclosed within a rear cover of a housing for the motor. The system includes an active cooling device having a first side and a second side opposite the first side. The active cooling device receives electrical power to generate a heat gradient across the active cooling device such that a first temperature of the first side is less than a second temperature of the second side when the electrical power is applied to the active cooling device. The first side of the active cooling device is mounted to the position feedback device, and the second side of the active cooling device is mounted to the housing. The system also includes a controller operative to enable and disable the active cooling device and at least one compliant thermal pad. Each compliant thermal pad is mounted to the active cooling device and between either the position feedback device or the rear cover of the housing.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
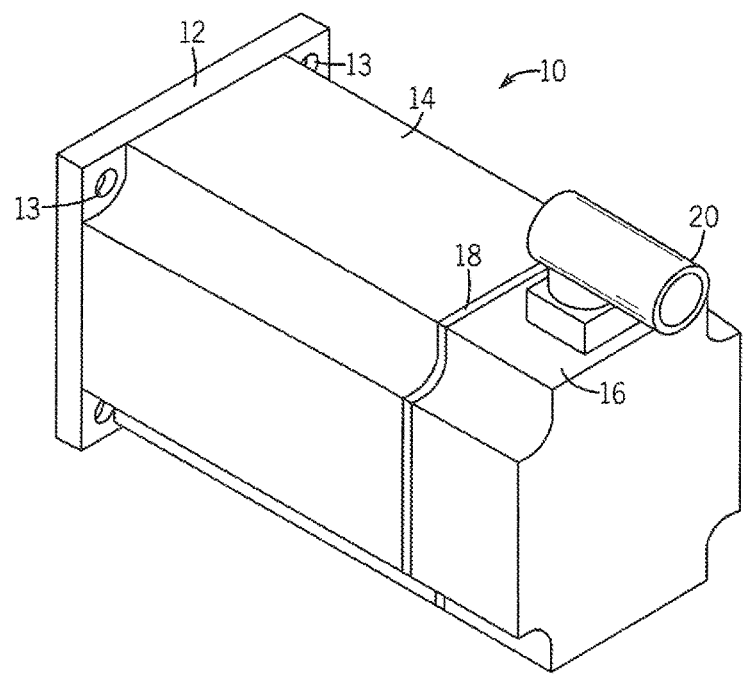
FIG. 1 is an isometric view of an exemplary motor on which an active cooling device may be mounted according to one embodiment of the invention.

In describing the various embodiments of the invention which are illustrated in the drawings, specific terminology will be resorted to for the sake of clarity. However, it is not intended that the invention be limited to the specific terms so selected and it, is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION OF THE PREFERRED EMBODIMENTS

Turning initially to FIG. 1, a motor assembly 10 may include a motor housing 14 extending longitudinally along the length of the motor. The motor housing 14 includes a mounting plate 12 at a first end of the motor housing 14 and a rear end cap 18 at the second end of the motor housing 14. The mounting plate 12 includes multiple mounting holes 13 through which a fastener, such as a bolt, may pass through to secure the motor to a device driven by the motor assembly 10. A rear cover 16 may be mounted to the rear end cap 18 to extend the, overall motor assembly 10. The rear cover 16 may be used to enclose devices mounted to the motor, protecting the devices from the environment. A connector 20 is provided on the rear cover 16 to establish electrical connections between devices within the rear cover and with devices, such as a controller, external to the rear cover 16. Optionally, the motor housing 14 may extend the entire length of the motor assembly 10. The devices mounted to the motor may be enclosed within the motor housing 14 and the rear end cap 18, and the connector 20 may be provided on a surface of the motor housing 14.

It is contemplated that the connector 20 may provide, for example, either pins or sockets to establish a mating connection with a complementary connector having either sockets or pins, respectively. The connector 20 may further include solder terminals, screw terminals or the like internal to the rear cover 16 to establish an electrical connection with the devices within the rear cover 16. Optionally, the connector 20 may provide a passage through the connector and be aligned with an opening in the rear cover 16 allowing one or more electrical conductors or cables to be routed through the connector 20. It is contemplated that still other connectors 20 may be utilized without deviating from the scope of the invention.

Figure 2:
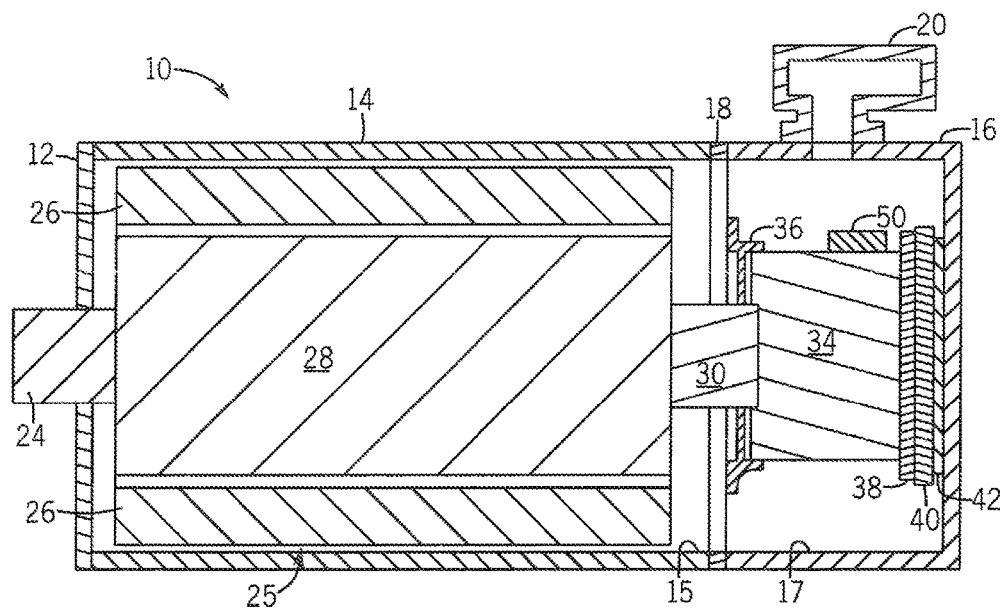
FIG. 2 is a sectional view of the motor of FIG. 1 illustrating one embodiment of the system for mounting the active cooling device to a device on the motor.

Referring next to FIG. 2, a sectional view of the motor assembly 10 illustrates a rotor 28 and a stator 26 of the motor 25. The motor 25 is located within a first chamber 15 defined by the motor housing 14, the mounting plate 12 and the rear end cap 18. Additional devices may be mounted to the motor 25 and enclosed in a second chamber 17 defined by a rear cover 16 mounted to the rear end cap 18. Optionally, the first and second chambers 15, 17 may be a single chamber with both the motor 25 and the additional devices located within the chamber and enclosed by the motor housing 14, mounting plate 12, and rear end cap 18. Referring again to FIG. 2, a first motor shaft 24 protrudes through the mounting plate 12. The first motor shaft 24 is coupled to and is rotated by the rotor 28. The first motor shaft 24 is configured to be connected via a suitable coupling to a device to be driven by the motor 25. A second motor shaft 30 protrudes through the rear end cap 18. The second motor shaft 30 is similarly coupled to and rotated by the rotor 28. The second motor shaft 30 is configured to be connected, for example, to a motor brake and/or a position feedback device 34. According to the illustrated embodiment, a position feedback device 34 is mounted to the rear end cap 18 via a-mounting bracket 36. According to, another embodiment of the invention, the position feedback device 34 may be mounted directly to the motor 25. Mounting the position feedback device 34 directly to the motor 25 may occur when, for example, the motor housing 14 extends the, length of the motor assembly 10 and the rear end cap 18 encloses the position feedback device 34. A rotating member of the position feedback device 34, such as rotating shaft or a disc within the position feedback device 34 is connected to the second motor shaft 30. The connection between the second motor shaft 30 and the rotating member of the position feedback device 34 may be made, for example, via a set screw, a key member and a keyway, or the like. Optionally, both the rotor 28 and the position feedback device 34 may have short shafts protruding and a coupler may be used to join the rotating shafts.

The position feedback device 34 may be, for example, a resolver or an encoder and generates a signal corresponding to the angular position of the rotor 28. The signal generated by the position feedback device 34 may be a single signal, or multiple signals. The signal may include a sinusoidal waveform, where a single cycle of the sinusoidal waveform corresponds to one rotation of the rotor 28. Optionally, a pair of phase-shifted sinusoidal waveforms may be provided such that both a position and direction of rotation may be determined. Optionally, the signal may be a square wave having a predefined number of pulses per revolution of the rotor 28. A pair of phase-shifted square waves may be provided such that both a position and direction of rotation may be determined from the square wave. The signal may further include a marker pulse generated once per rotation of the rotor 28 to identify a specific angular position. The marker pulse may be used in cooperation with the square wave signal(s) to determine an absolute angular position of the rotor 28. According to yet another embodiment of the invention, the position feedback device 34 may transmit position data directly or embedded within a data packet identifying the angular position of the rotor 28.

Connecting the position feedback device 34 to the second motor shaft 30 is not without certain challenges. Manufacturing tolerances will result in some misalignment between the rotating member of the position feedback device 34 and the second motor shaft 30. If the axes of rotation of each of the two rotating members are not aligned, some vibration will occur in the position feedback device 34 during operation. Even if the rotating member of the position feedback device 34 is aligned with the second motor shaft 30, variables during operation may subsequently result in misalignment. For example, temperature fluctuations and resulting thermal expansion/contraction or wear, for example, on a motor bearing supporting the second motor shaft 30 or on a bearing within the position feedback device 34 may allow for some lateral movement of the second motor shaft 30 or rotating member of the position feedback device 34 with respect to the axis of rotation. The lateral movement may occur once or may occur multiple times during a revolution of the motor 25. Thus, normal operation may cause misalignment between the two rotating members and subsequent vibration of the position feedback device 34.

In addition to the potential for misalignment, the potential exists that the temperature ratings for the motor assembly 10 and the position feedback device 34 to differ. The motor manufacturer designs the motor housing 14 to dissipate heat from the motor 25. During operation, the motor 25 generates different levels of heat as a function of the power level at which the motor 25 is operating. Further, the motor manufacturer may contemplate operation under severe environmental conditions and build the motor using materials such that the motor assembly 10 is configured to operate at maximum power and up to predefined temperature ratings.

While the manufacturer of the position feedback device 34 may similarly develop the position feedback device 34 to operate under comparable operating conditions, locating the position feedback device 34 within the rear cover 16 may subject the position feedback device 34 to additional heat. Heat from the motor 25 is transmitted, in part, into the chamber enclosed by the rear cover 16. The heat must radiate through the space to the surface of the rear cover 16 to then be conducted out of the chamber. In many applications, the enclosed position feedback device 34 becomes the limiting device with respect to the temperature rating at which the motor assembly 10 may operate because either the position feedback device 34 has a lower initial rating or enclosing the position feedback device 34 requires derating of the ambient temperature at which the device may operate. As a result, the motor 25 may not be operated up to its rated capacity, resulting in decreased efficiency and/or productivity or requiring a larger, more expensive motor 25 be installed such that the higher rated motor assembly 10 may still operate at the desired power levels.

Figure 3:
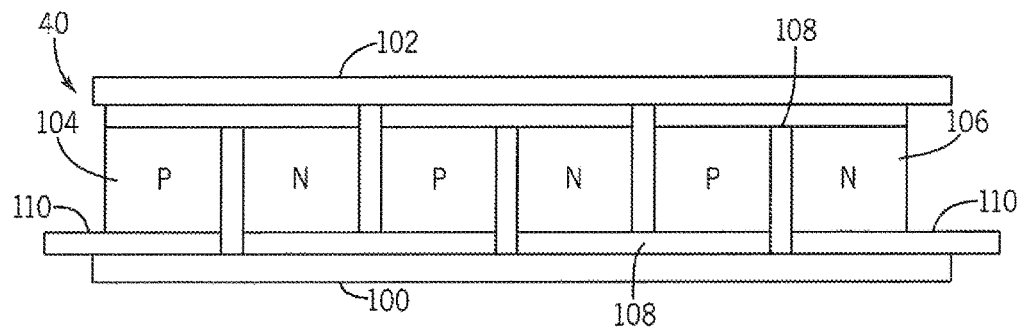
FIG. 3 is a partial schematic representation of an active cooling device utilized in one embodiment of the invention.
Figure 4:
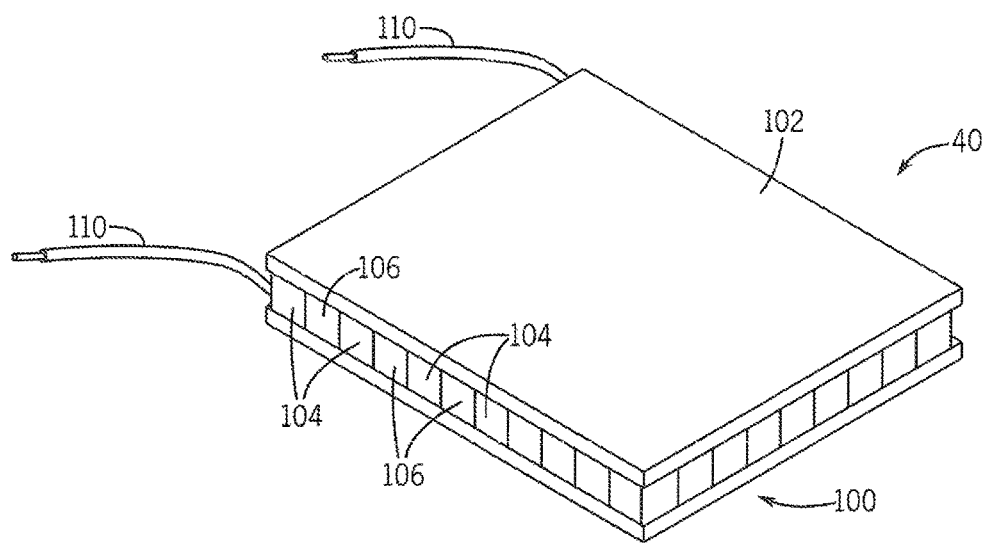
FIG. 4 is an isometric view of the active cooling device of FIG. 3.

Referring again to FIG. 2, an active cooling device 40 is mounted between an end of the position feedback device 34 and the inner surface of the rear cover 16. With reference also to FIGS. 3 and 4, the active cooling device 40 includes a first side 100 and a second side 102 opposite the first side, where each side 100, 102 is a generally planar surface. The active cooling device 40 receives electrical power and generates a beat gradient between the first side 100 and the second side 102. The cool side may be placed adjacent to a device to be cooled, such as the position feedback device 34, and the heat gradient in the active cooling device 40 causes heat to be drawn from the device to be cooled into the active cooling device 40 and dissipated from the warm side of the active cooling device 40. Optionally, the active cooling device 40 may be formed of any suitable geometry for mounting to any surface of the position feedback device 34 as long as the cool surface of the active cooling device 40 is placed adjacent the position feedback device 40 and the warm side of the active cooling device 40 is located adjacent the housing 14 of the motor assembly 10.

According to the illustrated embodiment, the active cooling device 40 utilizes two different semiconductor materials where one of the materials is a p-type semiconductor 104 and the other material is, an n-type semiconductor 106. The p-type and n-type semiconductors 104, 106 are arranged in an alternating fashion between the first side 100 and the second side 102 such that the devices are physically arranged in parallel to each other. Electrical connections 108 are made on alternating sides of the devices such that the semiconductors 104, 106 are electrically connected in series with each other. Electrical leads 110 are provided to which a voltage may be applied. When the voltage is applied across the electrical leads 110, a DC current is established across the junction of the semiconductors 104, 106 and the temperature gradient is established between the first side 100 and the second side 102 of the active cooling device 40. The cool side absorbs heat and is placed adjacent to a device to be cooled. The heat is transferred across the active cooling device via the temperature gradient and dissipated from the hot side of the active cooling device 40.

However, active cooling devices 40 require substantial power consumption during operation to maintain the temperature gradient across the device. Referring again to FIG. 2, a temperature sensor 50 may be provided in the chamber 17 defined by the rear cover 16 of the motor assembly 10. The temperature sensor 50 may be mounted to the position feedback device 34, the rear cover 16 or, optionally, to the endplate 18 of the motor 25. The temperature sensor 50 generates a signal corresponding to the temperature at the location in which the sensor 50 is mounted and transmits the signal back to a controller. Optionally, other temperature sensors may be utilized to control the active cooling device 40. For example, the temperature sensor 50 may be integrated within the motor 25 and the signal from the temperature sensor 50 corresponds to the temperature of the motor 25. According to yet another embodiment, the position feedback device 34 may include a temperature sensor and provide a signal corresponding to the temperature of the position feedback device 34. According to still another embodiment, the active cooling device 40 may include an integrated temperature sensor. Any of the signals may be provided to a controller to control operation of the active cooling device 40.

It is contemplated that the controller may be a programmable logic controller (PLC) executing a control program for the machine to which the motor assembly 10 is mounted. Optionally, the controller may be a motor drive configured to control operation of the motor 25. If the temperature measured by the temperature sensor 50 exceeds a predefined threshold, the controller generates a signal to enable the active cooling device 40. The signal may be a logic signal provided, for example, to a coil of a relay, and the relay, in turn, closes, connecting a power source to the active cooling device. Optionally, the controller may directly output the voltage required to operate the active cooling device 40. When the temperature level drops below the predefined threshold, or optionally below a second threshold, the controller disables the active cooling device 40. Thus, the controller may enable the active cooling device 40 when the temperature within the rear cover 16 is elevated, cooling the position feedback device 34 and allowing the motor assembly to operate at its full, rated power. It is further contemplated that the controller may monitor operating conditions other than the temperature to control operation of the active cooling device 40. For example, the controller may enable the active cooling device 40 any time the motor 25 is running. Optionally, the controller may receive a signal corresponding, for example, to the current supplied to or the torque commanded from the motor 25. The controller may monitor the signal over time and enable the active cooling device 40 if the current or torque provided over time exceeds a predefined threshold.

As discussed above, misalignment between the rotating member of the position feedback device 34 and the second, motor shaft 30 could result in vibration of the position feedback device. Because the position feedback device 34, active cooling device 40 and the rear cover 16 are typically rigid members, vibration of the position feedback device 34 could damage the active cooling device 40 or the position feedback device 34 if the active cooling device 40 is rigidly mounted between the position feedback device 34 and the rear cover 16. The vibration could also result in poor or intermittent contact between the active cooling device 40 and either the rear cover 16 or the position feedback device 34. As a result, a compliant mount is utilized in combination with the active cooling device 40 to accommodate vibration of the position feedback device 34.

According to illustrated embodiment, a first compliant thermal pad 38 is provided between the active cooling device 40 and the position feedback device 34 and a second compliant thermal pad 42 is provided between the active cooling device 40 and the rear cover 16. Optionally, a single compliant thermal pad may be provided on either side of the active cooling device 40. Each compliant thermal pad may be mounted to the position feedback device 34, the active cooling device 40, of the rear cover 16 with an adhesive. Similarly, the active cooling device 40 may be mounted to the position feedback device 34, a thermal pad 38, 42, or the rear cover 16 with an adhesive. Adhesive is provided between each surface of the position feedback device 34, thermal pad 38, active cooling device 40, and rear cover 16 as required to secure the thermal pad(s) 38, 42 and active cooling device 40 to either the rear cover 16 or the position feedback device 34. One pair of surfaces between the position feedback device 34, thermal pad 38, active cooling device 40, and rear cover 16 is press fit together such that the rear cover 16 may be removed from the position feedback device 34 for access to the position feedback device 34 and the end of the motor. The compliant thermal pads 38, 42 are deformable to absorb axial movement of the position feedback device 34 resulting from vibrations on the position feedback device 34 and resilient to return to an uncompressed state when no force is applied to the pad. The compliant thermal pads 38, 42 also exhibit thermal conductive properties such that heat is transferred from the position feedback device 34 to the active cooling device 40 and from the active cooling device 40 to the rear cover 16.

According to another embodiment of the invention, it is contemplated that the active cooling device 40 may be mounted directly to the rear cover 16 with a spacing arranged between the inside surface of the rear cover 16 and the position feedback device 34 substantially equivalent to the width of the active cooling device 40. When the rear cover 16 is mounted to the motor housing 14, the active cooling device 40 is press fit against the position feedback device 34. Optionally, the active cooling device 40 may be mounted directly to the position feedback device 34 and press fit to the rear cover 16. In either instance, a compliant mount may be provided between the position feedback device 34 and the rear end cap 18 of the motor. The compliant mount between the positional feedback device 34 and the rear end cap 18 of the motor is configured to absorb the vibrations of the position feedback device 34 and, as a result, a fixed position relationship may be established between the position feedback device 34, the active cooling device 40, and the rear cover 16. It is further contemplated that thermal pads, either compliant or rigid may be utilized in combination with a compliant mount between the positional feedback device 34 and the rear end cap 18 of the motor.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. A system for cooling a position feedback device mounted to a motor, wherein the position feedback device is enclosed within a housing connected to the motor, the system comprising:
    an active cooling device having a first side and a second side opposite the first side, wherein:
        the active cooling device receives electrical power to generate a heat gradient across the active cooling device such that a first temperature of the first side is less than a second temperature of the second side when the electrical power is applied to the active cooling device,
        the first side of the active cooling device is mounted to the position feedback device, and
        the second side of the active cooling device is mounted to the housing; and
    a mounting device for the position feedback device, wherein the mounting device is operatively connected to the position feedback device and to one of the motor and the active cooling device and wherein the mounting device is deformable to absorb axial movement of the position feedback device and resilient to return to an uncompressed state when no force is applied.

2. The system of claim 1 wherein the mounting device is operatively connected between the position feedback device and the active cooling device.

3. The system of claim 2 wherein the mounting device is a thermally conductive pad having a first surface and a second surface opposite the first surface, wherein the first surface is mounted to a surface of the position feedback device and the second surface is mounted to the first side of the active cooling device.

4. The system of claim 3 further comprising a second thermally conductive pad having a first surface and a second surface opposite the first surface, wherein the first surface of the second thermally conductive pad is mounted to the second side of the active cooling device and the second surface of the second thermally conductive pad is mounted to an interior surface of the housing.

5. The system of claim 1 wherein the mounting device is a mechanical coupling between the position feedback device and the motor.

6. The system of claim 5 further comprising a thermally conductive pad having a first surface and a second surface opposite the first surface, wherein the first surface of the thermally conductive pad is mounted to the second side of the active cooling device and the second surface of the thermally conductive pad is mounted to an interior surface of the housing.

7. The system of claim 1 further comprising:
a controller operative to enable and disable the active cooling device;
a temperature sensor generating a signal corresponding to a temperature of the position feedback device, wherein the controller enables the active cooling device when the signal corresponding to the temperature of the position feedback device exceeds a predetermined threshold.

8. The system of claim 7 wherein:
the housing includes a rear cover mounted to an end of the motor,
the rear cover encloses the position feedback device, and
the temperature sensor is mounted inside the rear cover.

9. A method of cooling a position feedback device mounted to a motor, wherein the position feedback device is enclosed within a rear cover of a housing for the motor, the method comprising the steps of:
mounting the position feedback device to the motor;
mounting an active cooling device, having a first side and a second side opposite the first side, to the position feedback device, wherein:
the active cooling device receives electrical power to generate a heat gradient across the active cooling device such that a first temperature of the first side is less than a second temperature of the second side when the electrical power is applied to the active cooling device,
the first side of the active cooling device is mounted to the position feedback device, and
the second side of the active cooling device is mounted to the housing; and
providing a compliant mount for the position feedback device wherein the compliant mount is operatively connected to the position feedback device and to one of the motor and the active cooling device and wherein the compliant mount is deformable to absorb axial movement of the position feedback device and resilient to return to an uncompressed state when no force is applied.

10. The method of claim 9 wherein the compliant mount is operatively connected between the position feedback device and the active cooling device.

11. The method of claim 10 wherein the compliant mount is a thermally conductive pad having a first surface and a second surface opposite the first surface, wherein the first surface is mounted to a surface of the position feedback device and the second surface is mounted to the first side of the active cooling device.

12. The method of claim 11 further comprising the step of providing a second thermally conductive pad having a first surface and a second surface opposite the first surface, wherein the first surface of the second thermally conductive pad is mounted to the second side of the active cooling device and the second surface of the second thermally conductive pad is mounted to an interior surface of the rear cover.

13. The method of claim 9 wherein the compliant mount is a mechanical coupling between the position feedback device and the motor.

14. The method of claim 13 further comprising the step of providing a thermally conductive pad having a first surface and a second surface opposite the first surface, wherein the first surface of the thermally conductive pad is mounted to the second side of the active cooling device and the second surface of the thermally conductive pad is mounted to an interior surface of the housing.

15. The method of claim 9 further comprising the steps of:
receiving a signal from a temperature sensor corresponding to a temperature of the position feedback device at a controller; and
enabling the active cooling device with the controller when the signal corresponding to the temperature of the position feedback device exceeds a predetermined threshold.

16. The method of claim 15 wherein the temperature sensor is mounted inside the rear cover.

17. A system for cooling a position feedback device mounted to a motor, wherein the position feedback device is enclosed within a rear cover of a housing for the motor, the system comprising:
an active cooling device having a first side and a second side opposite the first side, wherein:
the active cooling device receives electrical power to generate a heat gradient across the active cooling device such that a first temperature of the first side is less than a second temperature of the second side when the electrical power is applied to the active cooling device,
the first side of the active cooling device is mounted to the position feedback device, and
the second side of the active cooling device is mounted to the housing;
a controller operative to enable and disable the active cooling device; and
at least one thermally conductive pad mounted to the active cooling device and between at least one of the position feedback device and the rear cover of the housing wherein the thermally conductive pad is deformable to absorb axial movement of the position feedback device and resilient to return to an uncompressed state when no force is applied.

18. The system of claim 17 wherein the controller is a motor drive operatively connected to the motor to control operation of the motor.

19. The system of claim 17 further comprising a temperature sensor generating a signal corresponding to a temperature of the motor, wherein the controller enables the active cooling device when the signal corresponding to the temperature of the motor exceeds a predetermined threshold.

20. The system of claim 19 wherein the temperature sensor is mounted inside the rear cover.

* * * * *